United States Patent Office
3,629,280
Patented Dec. 21, 1971

3,629,280
CYCLIC UREA AMIDE PHOSPHATES USEFUL AS INSECTICIDES
Peter E. Newallis, Overland Park, Kans., assignor to Allied Chemical Corporation, New York, N.Y.
No Drawing. Filed Dec. 29, 1967, Ser. No. 694,418
Int. Cl. C07d 49/30
U.S. Cl. 260—309.7
4 Claims

ABSTRACT OF THE DISCLOSURE

A new class of cyclic urea amide phosphates and phosphonates, utilized as insecticides, and having the following general structure covering the compounds of this invention:

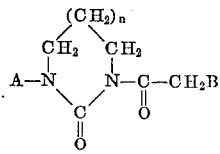

wherein $n=0, 1$

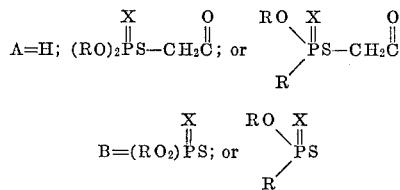

and wherein R=lower alkyl group having 1–5 carbon atoms; X=O or S.

BACKGROUND OF THE INVENTION

This invention relates to a new class of phosphates and phosphonates useful as insecticides and acaricides and in particular to a new class of cyclic urea amide phosphates and phosphonates.

The requirements for useful insecticides and acaricides vary depending upon the kind of application intended. To be successful, an insecticide must, of course, be toxic to the insect or acarid to be controlled. For some applications, it is desirable that the insecticide be stable and have extended residual activity; for other applications, it is desirable that its useful life be short. When the insecticides are used by unskilled personnel, it should be relatively non-toxic to mammals, in other cases, particularly where it is to be applied only by skilled personnel, the mammalion toxicity is less of a factor. Of course, where the insecticide is to be applied to the foliage or roots of plants, or to soil in which the plant is growing, it must be non-phytotoxic, at least at the insecticidal dosage.

It is an object of this invention to provide a new class of phosphates and phosphonates as insecticides.

It is another object of this invention to provide a new class of cyclic urea amide phosphates.

It is an additional object of this invention to provide a method for producing a new class of cyclic urea amide phosphates.

SUMMARY OF THE INVENTION

The following general structures represent the compounds of the invention:

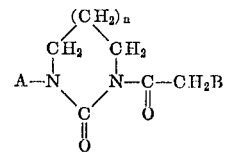

wherein $n=0, 1$

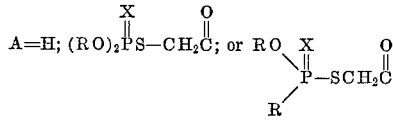

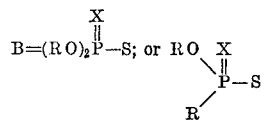

and wherein R=lower alkyl group having 1–5 carbon atoms; and X=O or S.

These compounds are viscous liquids which are soluble in many organic solvents but are essentially insoluble in water. They have an outstanding acaricidal activity, and are characterized by low toxicity for warm-blooded animals. Accordingly, they can be used safely and very effectively for combatting eggs and active stages of spider mites in the protection of plants. These compounds can also be used as active toxicants in compositions for the control of a number of insect organisms such as flies, beetles, worms, roaches, cattle grubs, and aphids. Furthermore, the toxic potency of this class of compounds is such as to permit their effective use as dilute solutions in soaps, sprays, paints, and oils.

Generally the synthesis of this class of compounds may be carried out by reacting a urea chloroacetamide with an ammonium salt of an alkyl phosphorothioate or dithiophosphate as illustrated by the following reaction:

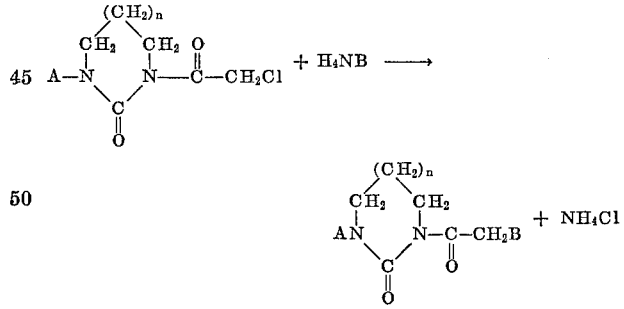

wherein $n$, A, B, R, and X have the same significance as indicated above. The reaction may be carried out in any common inert organic solvent such as acetone, benzene, dimethylformamide or carbon tetrachloride. Approximate stoichiometric amounts of the reactants are used. The mixture is refluxed for 14–36 hours and preferably from 20–30 hours. The acetone or other solvent is then removed by distillation under reduced pressure and the residue is extracted by adding methylene chloride or other suitable extractive compound. The methylene chloride solution is then washed with water and separated out. Finally, the organic solution is dried and the methylene chloride is removed by distillation to leave the residue product.

DESCRIPTION OF THE PREFERRED EMBODIMENT

Preparations of typical compounds of the invention are described in the following example. The examples are intended to be illustrative and are not to be considered as limiting the invention in any way.

EXAMPLE I

A solution was prepared by adding 8.1 grams of ethylene urea-α-chloroacetamide to 100 ml. of acetone. Then 9.5 grams of S-ammonium O,O-diethyl phosphorothioate were added to the solution. The solution was then refluxed for over a 24 hour period. At this point the acetone was removed by distillation under reduced pressure leaving the residue. The product was extracted from the residue by the addition of 100 ml. of methylene chloride. The methylene chloride solution was then washed with 50 ml. of water and the organic solution was separated from the aqueous solution. The organic solution was dried and the methylene chloride solvent was removed by distillation in vacuum. The residue product, N-(O,O-diethylphosphorothioxyacetyl - ethyleneurea), which is listed in Table I as Compound 3, weighed 13.5 grams. This product was insoluble in water and soluble in acetone.

Table I lists other compounds of this invention which were prepared by a method similar to that used in Example I.

TABLE I

| Compound Number | Compound |
|---|---|
| 1 | $HN\underset{\underset{O}{\parallel}}{\overset{}{\diagdown}}N-\overset{O}{\overset{\parallel}{C}}-CH_2\overset{S}{\overset{\parallel}{P}}(OC_2H_5)_2$ |
| 2 | $(C_2H_5O)_2\overset{S}{\overset{\parallel}{P}}SCH_2\overset{O}{\overset{\parallel}{C}}-N\diagdown N-\overset{O}{\overset{\parallel}{C}}-CH_2\overset{S}{\overset{\parallel}{P}}(OC_2H_5)_2$ |
| 3 | $HN\diagdown NO-CH_2\overset{S}{\overset{\parallel}{P}}(OC_2H_5)_2$ |
| 4 | $HN\diagdown N\overset{O}{\overset{\parallel}{C}}-CH_2\overset{S}{\overset{\parallel}{P}}(OCH_3)_2$ |
| 5 | $HN\diagdown N\overset{O}{\overset{\parallel}{C}}-CH_2\overset{S}{\overset{\parallel}{P}}\diagup \overset{CH_3}{\underset{OC_2H_5}{}}$ |
| 6 | $(C_2H_5O)_2\overset{S}{\overset{\parallel}{P}}SCH_2\overset{O}{\overset{\parallel}{C}}-N\diagdown N-\overset{O}{\overset{\parallel}{C}}-CH_2\overset{O}{\overset{\parallel}{P}}(OC_2H_5)_2$ |
| 7 | $(CH_3O)_2\overset{S}{\overset{\parallel}{P}}SCH_2\overset{O}{\overset{\parallel}{C}}-N\diagdown N-\overset{O}{\overset{\parallel}{C}}-CH_2\overset{O}{\overset{\parallel}{P}}(OCH_3)_2$ |
| 8 | $(C_2H_5O)_2\overset{O}{\overset{\parallel}{P}}SCH_2\overset{O}{\overset{\parallel}{C}}-N\diagdown N-\overset{O}{\overset{\parallel}{C}}-CH_2\overset{S}{\overset{\parallel}{P}}(OC_2H_5)_2$ |
| 9 | $(CH_3O)_2\overset{O}{\overset{\parallel}{P}}SCH_2\overset{O}{\overset{\parallel}{C}}-N\diagdown N-\overset{O}{\overset{\parallel}{C}}-CH_2\overset{O}{\overset{\parallel}{S}}P(OCH_3)_2$ |
| 10 | $(C_2H_5O)_2\overset{S}{\overset{\parallel}{P}}S-CH_2\overset{O}{\overset{\parallel}{C}}-N\diagdown N-\overset{O}{\overset{\parallel}{C}}-CH_2\overset{S}{\overset{\parallel}{P}}(OC_2H_5)$ |

In using the compounds of this invention as insecticides, the undesirable organism may be killed by contacting the insect directly, by contacting the insect through its habitat, or by contacting the insect through its food prior to ingestion with toxic amounts of the compounds. Standardized tests were conducted to determine the effectiveness as insecticides of the compounds listed in Table I against adult house flies (HFA), two-spotted spider mites (TSSM), Mexican bean beetle larvae (MBBL), pea aphid adults (PAA), and southern armyworm larvae (SAL).

The following non-systemic tests were performed to illustrate the effectiveness of the compounds of Table I.

Test I.—Non-systemic primary test for Mexican bean beetle larvae (MBBL)

A solution consisting of 4.8 gm. of Compound 1 was mixed in 100 cc. of acetone. The solution was diluted with water so that the concentration of Compound 1 was ½ oz./100 gal.

Horticultural (cranberry) bean plants, in 2½ inch pots with all foliage removed except one primary leaf, were sprayed with the solution for 2 seconds on the upper surface and 5 seconds on the under surface. The spray was delivered from a De Vilbiss atomizer nozzle at 20 p.s.i. The approximate volume of spray on the upper surface was 0.19 cc. and the under surface was 0.48 cc. After spraying the deposits were allowed to dry on the plants and 5 3rd instar larvae were then confined on each plant with 6 inch screen wire spheres. Mortality and feeding records were made 3 days after treatment.

Test II.—Non-systemic test for pea aphid adults (PAA)

A solution consisting of 4.8 grams of Compound 1 was mixed in 100 cc. of acetone. The solution was diluted with water so that the concentration of Compound 1 was ½ oz./100 gal.

English broad bean plants were sprayed for 2 seconds on upper surface and 5 seconds on under surface with this solution. Adult female aphides (10 per test) were brushed from infested broad bean plants into 5 inch screen wire hemispheres and sprayed for 5 seconds (approx. 0.6 cc. delivery per second from nozzle). Spray was applied from a DeVilbiss atomizer nozzle at 20 p.s.i., with the aphids 15 inches from the nozzle. Following treatment, aphids were caged over previously sprayed plants and mortality records were usually made 3 days later.

Test III.—Non-systemic primary test for southern armyworm larvae (SAL)

A solution consisting of 4.8 gms. of Compound 1 was mixed in 100 cc. of acetone. The solution was diluted with water so that the concentration of Compound 1 was 4 oz./100 gal.

Horticultural (cranberry) bean plants, in 2½ inch pots with all foliage removed except one primary leaf, were sprayed with the solution for 2 seconds on the upper surface and 5 seconds on the under surface. The spray was delivered from a DeVilbiss atomizer nozzle at 20 p.s.i. The approximate volume of spray on the upper surface was 0.19 cc. and the under surface was 0.48 cc. After spraying, the deposits were allowed to dry on the plants and 5 4th and 5th instar larvae were then confined on each plant with 6-inch screen wire spheres. Mortality and feeding records were made 3 days after treatment.

Test IV.—Non-systemic primary test for two-spotted spider mites (TSSM)

A solution was prepared of 4.8 gm. of Compound 1 in 100 cc. of actone. The solution was diluted with water to a concentration of 4 oz./100 gal. of Compound 1.

Young horticultural (cranberry) bean plants in 2½ inch pots were infested with mites (all stages) one day before treatment. In treating plants the upper surfaces was sprayed with the solution for two seconds and the lower or under surface was sprayed for 5 seconds. The spray was delivered from a DeVilbiss atomizer nozzle operated at 20 p.s.i. with the plant about 18" from nozzle. The approximate volume of spray on the upper surface was 0.13 cc. and on the lower surface was 0.21 cc. Following the treatment, the potted plants were placed in irrigated trays in the greenhouse and initial kills of adults were recorded three days later. Residual and ovicidal observations were made 7–8 days after treatment, which allowed ample time for the eggs to hatch under greenhouse conditions. One leaf from each plant was used to make 3-day counts, and the remaining leaf on each plant was used to determine residual and ovicidal activity.

Test V.—Non-systemic primary test for house fly adults (HFA)

Dry food (6 parts powdered non-fat dry milk, 6 parts granulated sugar and 1 part powdered egg) was mixed with an acetone solution of Compound 1 so that the food contained 0.125% of the compound. The mixture was allowed to dry and then repulverized. Wettable powders were mixed with the dry food with the aid of mortar and pestle. The treated food was placed in emergence cages containing 50 fly pupae. Cages containing untreated food were used as checks. Examination of each cage was made periodically for 8 days to determine emergence, condition of flies, and acute toxicity.

Similar tests were performed for Compounds 2 and 10, the results of which are also disclosed with Compound 1 in Table II. It should be noted that with the exception of the southern armyworm larvae the compounds tested were on the whole very effective.

The same compounds were then put through systemic primary tests. The systemic primary tests were conducted for MBBL, PAA, SAL, and TSSM.

TABLE II.—RESULTS OF NON-SYSTEMIC PRIMARY TESTS

| | Percent mortality | | | | |
|---|---|---|---|---|---|
| | Used in dilution ½ oz./100 gallons H₂O | Used in dilution 4 oz./100 gallons H₂O | | | Percent 8 day kill (0.125% dry bait) |
| Compound | MBBL, Test I | PAA, Test II | SAL, Test III | TSSM, Test IV | HFA, Test V |
| 1 | 100 | ¹100 | 0 | 100 E.R.** | 100 |
| 2 | 75 | 0 | 0 | 89 N.O.R. | 100 |
| 10 | 0 | 0 | 0 | 100 N.O.R. | 100 |

¹ No live young.
NOTE.—**E.R.=Excellent residual; N.O.R.=No ovicidal or residual.

Test VI.—Systemic primary test for Mexican bean beetle larvae (MBBL)

A standard acetone solution containing 4.8 grams of Compound 1 per 100 cc. of acetone was diluted with water to 4 oz./100 gals. of H₂O. After dilution, 100 cc. of the solution were placed in glass jars, along with the test plants (young horiticultural (cranberry) bean plants) whose roots had been washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were made 3 days later.

Test VII.—System primary test for pea aphid adults (PAA)

A standard acetone solution containing 4.8 grams of Compound 1 per 100 cc. of acetone was diluted with water to 4 oz./100 gals. H₂O. After dilution, 100 cc. of the solution were placed in glass jars, along with the test plants (young English broad bean plants) whose roots had been washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were made 3 days later.

Test VIII.—Systemic primary test for southern armyworm larvae (SAL)

A standard acetone solution containing 4.8 grams of Compound 1 per 100 cc. of acetone was diluted with water to 4 oz./100 gals. of H₂O. After dilution, 100 cc. of the solution were placed in glass jars, along with the test plants (young horticultural (cranberry) bean plants) whose roots have been washed free of soil. The roots of the test plants were in contact with the bottom of the container. Aluminum foil was fitted over the top of the container and around the stem of the plant to lessen possible fumigant effects of the compound tested. The insects were placed on the plants within 24 hours after treatment and the mortality records were made 3 days later.

Test IX.—Systemic primary test for two-spotted spider mites (TSSM)

A standard acetone solution containing 4.8 grams of Compound 1 per 100 cc. of acetone was diluted with water to 4 oz./100 gals. of H₂O. After dilution, 100 cc. of the solution were placed in glass jars, along with the test plants (young horticultural (cranberry) bean plants) whose roots had been washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were made 3 days later. The ovicidal and residual data was recorded 8 days after the treatment.

The results of Tests VI–IX for compounds 1, 2, and 10 are listed in Table III.

It is noted that the compounds were not very effective against MBBL and SAL but very effective against PAA and TSSM.

The illustrations of the compounds that constitute the invention given above are not intended to limit the invention in any way but are merely descriptive. All modifications which fall within the spirit of the present invention are claimed as part of the present invention.

TABLE III.—RESULTS OF SYSTEMIC PRIMARY TESTS

| | Percent mortality | | | |
|---|---|---|---|---|
| | Used in dilution of 4 oz./100 gallons H₂O | | | |
| Compound | Test VI, MBBL | Test VII, PAA | Test VIII, SAL | Test IX, TSSM |
| 1 | 40 | ¹100 | 0 | 100 G.R.** |
| 2 | 0 | 100 | 0 | 5.0 F.R. |
| 10 | 0 | 100 | 0 | 73 G.R. |

¹ No living young on test plants.
NOTE.—**N.R.=no residual; F.R.=fair residual; G.R.=good residual.

I claim:
1. A compound of the formula:

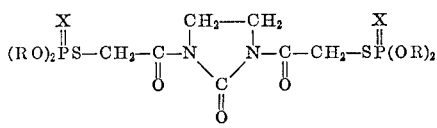

wherein: R=alkyl of 1-5 carbon atoms; and X=O or S.
2. A compound as claimed in claim 1 wherein R represents ethyl.
3. A compound as claimed in claim 1 wherein R represents methyl.
4. A compound as claimed in claim 1 wherein R represents ethyl and X represents S.

References Cited

UNITED STATES PATENTS

| | | |
|---|---|---|
| 2,852,514 | 9/1958 | Schrader et al. __ 260—326.5 A |
| 2,706,194 | 4/1955 | Morris et al. _____ 260—244 |
| 2,914,530 | 11/1959 | Schrader et al. _____ 260—248 |
| 3,134,801 | 5/1964 | Sehring et al. ____ 260—326.5 A |
| 3,232,987 | 2/1966 | Lutz et al. _____ 260—561 P |
| 3,406,179 | 10/1968 | Jamison _____ 260—309.7 |

FOREIGN PATENTS

| | | |
|---|---|---|
| 1,093,728 | 5/1955 | France _____ 260—309.5 |

NATALIE TROUSOF, Primary Examiner

U.S. Cl. X.R.

260—251 P; 424—251, 273

Page 1 of 2 Pages

UNITED STATES PATENT OFFICE
CERTIFICATE OF CORRECTION

Patent No. 3,629,280    Dated December 21, 1971

Inventor(s)  PETER E. NEWALLIS

It is certified that error appears in the above-identified patent and that said Letters Patent are hereby corrected as shown below:

Column 1, line 33, " $(RO_2)$ " should be -- $(RO)_2$ --

Column 3, Compound 2, "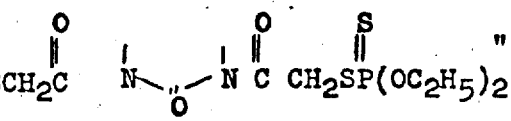"

should be -- 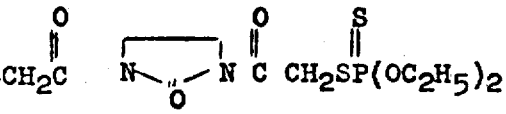 --

Column 3, Compound 3, " 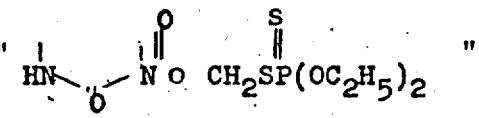 "

should be --  --

Column 3, Compound 6, "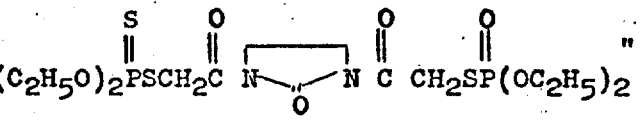"

should be -- 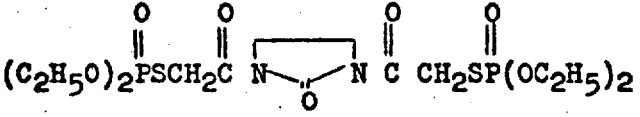 --

Column 3, Compound 7, "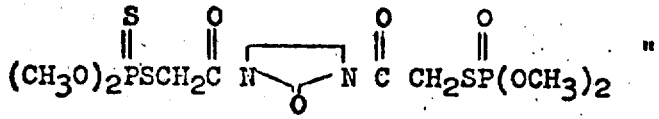"

should be --  --

(SEE ATTACHED SHEET FOR CONCLUSION)

UNITED STATES PATENT OFFICE
CERTIFICATE OF CORRECTION

Patent No. 3,629,280            Dated December 21, 1971

Inventor(s) PETER E. NEWALLIS

It is certified that error appears in the above-identified patent and that said Letters Patent are hereby corrected as shown below:

Column 3, Compound 8, "$(C_2H_5O)_2\overset{O}{\underset{\|}{P}}SCH_2\overset{O}{\underset{\|}{C}}N\underset{O}{\diagdown\diagup}N\overset{O}{\underset{\|}{C}}CH_2S\overset{S}{\underset{\|}{P}}(OC_2H_5)_2$"

should be -- $(C_2H_5O)_2\overset{O}{\underset{\|}{P}}SCH_2\overset{O}{\underset{\|}{C}}N\underset{O}{\diagdown\diagup}N\overset{O}{\underset{\|}{C}}CH_2S\overset{O}{\underset{\|}{P}}(OC_2H_5)_2$ --

Column 3, Compound 9, " $(CH_3O)_2\overset{O}{\underset{\|}{P}}SCH_2\overset{O}{\underset{\|}{C}}N\underset{O}{\diagdown\diagup}N\overset{O}{\underset{\|}{C}}CH_2S\overset{O}{\underset{\|}{P}}(OCH_3)_2$ "

should be -- $(CH_3O)_2\overset{S}{\underset{\|}{P}}SCH_2\overset{O}{\underset{\|}{C}}N\underset{O}{\diagdown\diagup}N\overset{O}{\underset{\|}{C}}CH_2S\overset{S}{\underset{\|}{P}}(OCH_3)_2$ --

Column 5, line 18, "0.21" should be --0.32--

Column 6, line 4, "System" should be --Systemic--

Signed and sealed this 23rd day of May 1972.

(SEAL)
Attest:

EDWARD M.FLETCHER,JR.            ROBERT GOTTSCHALK
Attesting Officer                 Commissioner of Patents